United States Patent [19]

Giek et al.

[11] Patent Number: 5,070,740

[45] Date of Patent: * Dec. 10, 1991

[54] SHIFTING ARRANGEMENT FOR AN AUTOMATIC TRANSMISSION OF A MOTOR VEHICLE

[75] Inventors: Manfred Giek, Schwieberdingen; Hans-Dieter Schuette, Neubulach, both of Fed. Rep. of Germany

[73] Assignee: Dr. Ing. h.c.F. Porsche AG, Fed. Rep. of Germany

[*] Notice: The portion of the term of this patent subsequent to Jan. 29, 2008 has been disclaimed.

[21] Appl. No.: 567,788

[22] Filed: Aug. 15, 1990

Related U.S. Application Data

[63] Continuation-in-part of Ser. No. 302,387, Jan. 27, 1989, Pat. No. 4,987,792.

[30] Foreign Application Priority Data

Mar. 10, 1988 [DE] Fed. Rep. of Germany ....... 3807881
Aug. 18, 1989 [DE] Fed. Rep. of Germany ....... 3927248

[51] Int. Cl.$^5$ .......................... B60K 20/00; F16N 3/14
[52] U.S. Cl. .................................... 74/473 R; 74/335; 200/61.88
[58] Field of Search ............................ 74/473 R, 335; 200/61.88

[56] References Cited

U.S. PATENT DOCUMENTS

| | | | |
|---|---|---|---|
| 1,541,021 | 6/1925 | Bachle | 200/61.88 X |
| 3,527,116 | 9/1970 | Kimberlin | 74/335 X |
| 4,091,372 | 5/1978 | Blaha et al. | 200/61.88 X |
| 4,590,817 | 5/1986 | Bennett | 74/473 R |

FOREIGN PATENT DOCUMENTS

| | | |
|---|---|---|
| 3231991 | 3/1983 | Fed. Rep. of Germany . |
| 3807881 | 9/1989 | Fed. Rep. of Germany . |
| 3905769 | 9/1989 | Fed. Rep. of Germany . |
| 1158829 | 7/1969 | United Kingdom . |

*Primary Examiner*—Allan D. Herrmann
*Assistant Examiner*—David W. Laub
*Attorney, Agent, or Firm*—Evenson, Wands, Edwards, Lenahan & McKeown

[57] ABSTRACT

A shifting arrangement for an automatic transmission of a motor vehicle, which is influenced by an electronic control unit, comprises a selector lever which can be pivoted in two shifting paths. Via the selector lever, operating positions and automatically shifting transmission gears can be selected in the first shifting path. In the second shifting path, individual gears can be shifted in such a manner (step-by-step shifting) that upshifting and return shifting may take place from a center position of the selector lever. The individual gears are shifted using the selector lever by electronic sensors. These sensors are formed by switches which interact with devices which try to hold the selector lever in its neutral center position.

15 Claims, 2 Drawing Sheets

SHIFTING ARRANGEMENT FOR AN AUTOMATIC TRANSMISSION OF A MOTOR VEHICLE

This Application is a Continuation-in-Part of pending U.S. patent application, Ser. No. 07/302,387, filed on Jan. 27, 1989, now U.S. Pat. No. 4987792 claiming priority of German Application P 38 07 881.3, filed in Germany on Mar. 10, 1988. This Application is also related to U.S. patent application Ser. No. 07/562,930 filed on Aug. 6, 1990, claiming priority of German Application P. 3927 250. 8, filed in Germany on Aug. 18, 1989.

BACKGROUND AND SUMMARY OF THE INVENTION

In a shifting arrangement described in German Patent Document DE-A 38 07 881, upon which the above-mentioned parent application is based, good results are achieved with respect to the gear shifting possibilities by means of the selector lever. These gear shifting possibilities include a first shifting path for automatic transmission and a second shifting path for individual gear shift operation.

An object of the present invention is to further improve a shifting arrangement for an automatic transmission having a selector lever that can be adjusted in two shifting paths so that the change-over from the first shifting path to the second shifting path and vice versa is operationally reliable while keeping the means and expenditures acceptable. However, it should also be ensured that the sensors which are controlled by the selector lever in the individual gear shift shifting path and the elements of the selector lever which cause the neutral center position are constructed and arranged in an operationally appropriate manner and are simple in their construction.

This and other objects are achieved by the present invention which provides a shifting arrangement for an automatic transmission of a motor vehicle which is influenced by an electronic control unit comprising a selector lever pivotable in a first shifting path to select several operating positions and automatically shifting transmission gears. The selector lever is movable via a transverse path into a second shifting path parallel with respect to the first shifting path, a pivoting of the selector lever in a first direction from a neutral center position in the second shifting path causing an upshifting by one gear and a pivoting in a second direction from the neutral center position causing a downshifting by one gear, the selector lever returning to the neutral center position after a shifting operation in the second shifting path. A first switch is arranged so as to be actuable by the pivoting of the selector lever in the first direction to cause the upshifting. A second switch is arranged so as to be actuable by the pivoting of the selector lever in the second direction to cause the downshifting. A first device interacts with the first switch to actuate the first switch, while a second device interacts with the second switch to actuate the second switch. The first and second devices each includes a pin and a spring that loads the pin against the selector lever in the direction of the neutral center position.

One of the advantages achieved by the present invention is that the devices comprising the pins and springs, on the one hand, hold the selector lever well in its neutral center position and, on the other hand, securely actuate the corresponding electrical switches during the upshifting and the return shifting. The devices as well as the switches are simple inexpensive components which - if necessary, together with additional contact devices - can easily be mounted on the bearing plate which, together with the mentioned switches and contact devices, may from a prefabricated component.

For generating a defined pressure point at the selector lever, the pins actuate the switches in a force optimum of the springs. As a result, the driver obtains perceptible information concerning the correct pivoting of the selector lever and connecting of a desired individual gear.

Other objects, advantages and novel features of the present invention will become apparent from the following detailed description of the invention when considered in conjunction with the accompanying drawings.

DETAILED DESCRIPTION OF THE DRAWINGS

Figure 1:
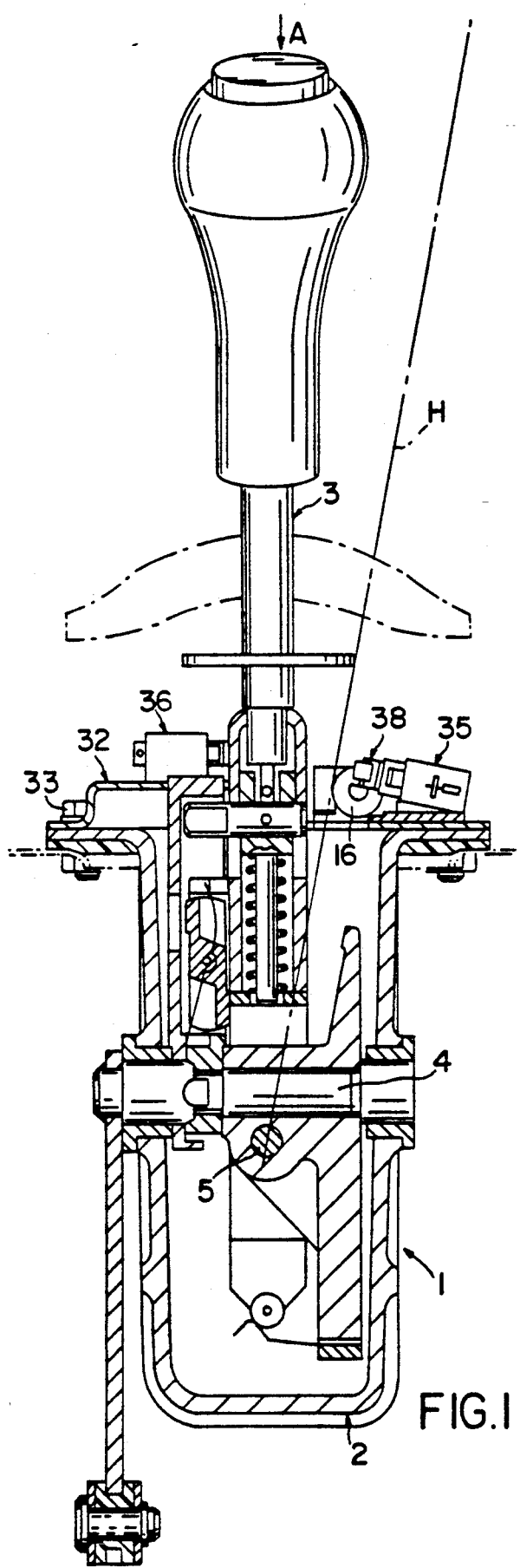
FIG. 1 is a cross-sectional view of a shifting arrangement constructed in accordance with an embodiment of the present invention having a selector lever that can be pivoted in two shifting paths.
Figure 2:
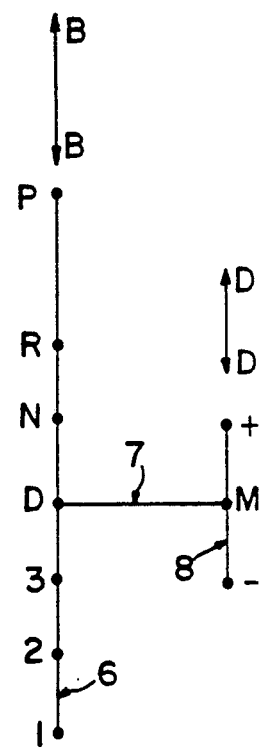
FIG. 2 is a shifting diagram of the selector lever of FIG. 1.

An automatic transmission for a motor vehicle, which can be controlled by an electronic control unit, can be influenced by a shifting arrangement 1. The control unit, the automatic transmission and the motor vehicle are not shown in detail in the Figures. Reference is made for this purpose to the German Patent Document DE-A 38 07 881 that forms the basis for the priority of the parent of this application and is herein incorporated by reference.

The shifting arrangement 1 comprises a container-type housing 2 which has a U-shaped cross-section and is made of plastic, cast light metal or the like. In the housing 2, a selector lever 3 is disposed on a shaft 4 extending transversely to the longitudinal direction B-B (FIG. 3) of the vehicle and on a shaft 5 aligned in the longitudinal direction B-B of the vehicle. By means of this cardanic mounting, the selector lever 3 can be pivoted in a first shifting path 6 (in the longitudinal direction B-B of the vehicle) in which different positions, such as P=Parking; R=Reverse; N=Neutral; D - Drive in the 4th gear; 3=3rd gear; 2=2nd gear; 1=1st gear of the automatic transmission can be shifted. The selector lever 3 can also be changed over from position D of the first shifting path 6, by way of a transverse path 7, into a second shafting path 8. The first shifting path 6 and the second shifting path 8 extend parallel with respect to one another forming a double T with the transverse path 7.

After the selector lever 3 is introduced into the second shifting path 8, it can also be pivoted in the longitudinal direction B-B of the vehicle. In this case, an upshifting by one gear respectively is caused by a one-time pivoting of the selector lever 3 from a center position M into the plus direction (+), with step-by-step shifting. The return shifting, also by one gear respectively, takes place by the pivoting of the lever in the minus direction (−). The selector lever 3 is automatically placed back in its neutral position M after each shifting operation in the plus or minus direction.

Figure 3:
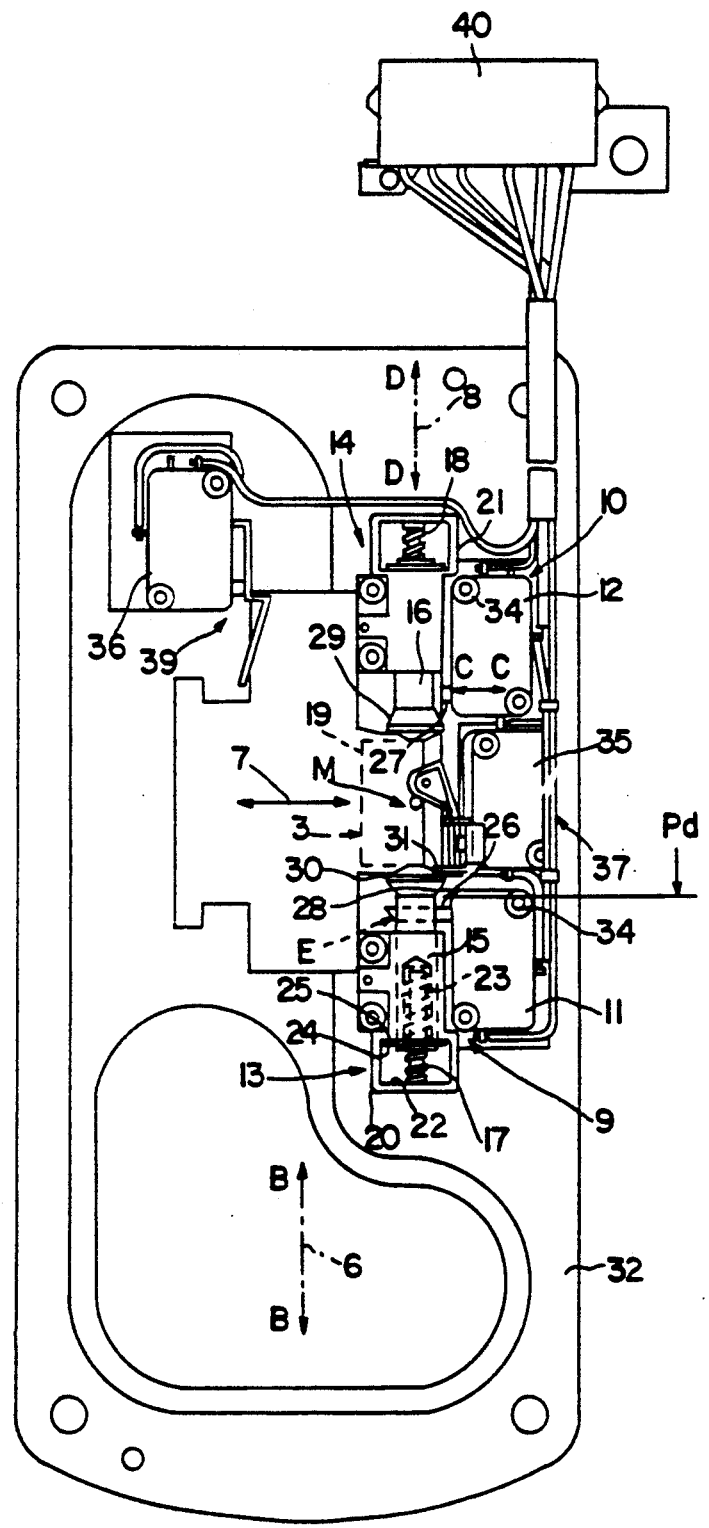
FIG. 3 is a view in the direction of Arrow A of FIG. 1.

As shown in FIG. 3, sensors 9, 10 are provided for sensing the upshifting and return shifting in the second shifting path 8. These sensors 9, 10 are controlled by the lever 3 and are formed by switches 11, 12. The switches 11, 12 interact with devices 13, 14 which have axially movable pins 15, 16 and springs 17, 18. The springs 17, 18 and the pins 15, 16 are biased to hold the selector lever 3 in its center position M. In this case, the two pins 15, 16 support themselves directly at the selector lever 3 or at a local thickening 19 of the selector lever 3 and are thus aligned in a longitudinal direction D-D that is parallel to the longitudinal direction B-B of the vehicle. The springs 17, 18, which are constructed as coil springs, are arranged coaxially with respect to the pins 15, 16. The springs 17, 18 are housed in housings 20, 21. Spring 17 supports itself at a rear wall 22 of the housing 20 and projects into a bore 23 of pin 15 in such a manner that pin 15, by means of a stop 24, is braced against another wall 25 of the housing 20.

The switches 11, 12 have actuating pins 26, 27 which can be adjusted in a direction C-C that is transverse with respect to the longitudinal direction D-D of the shifting path 8 and the pins 15, 16. Ramps 28, 29 of the pins 15, 16 are used for the adjusting of the actuating pins 26, 27. Each ramp 28 is a cone which widens from the cylindrical pin 15 to form a head 30 which has a conical beveling 31 and supportingly cooperates with the thickening 19 of the selector lever 3.

When the pin 15 is adjusted in the minus direction (−) by means of the selector lever 3, the switch 11 is actuated by actuating pin 26 after it reaches position E. In this case, a defined pressure point Pd is generated at the selector lever 3 which is situated in a force optimum of the spring 17. The pressure point Pd may be determined empirically and/or by calculation.

The switches 11, 12 and the devices 13, 14 are fastened on a bearing plate 32 constructed with a U-shaped cross-section which may be a sheet metal part and, as a cover, is held on the top side of the housing 2 by means of screws 33. The switches 11, 12 and the devices 13, 14 are held at the bearing plate 32 by fastening devices 34, such as screws, rivets or the like. The following components are also fastened on the bearing plate 32: a contact device 35 for the operation of the individual gear shifting in the second shifting path 8, and another contact device 36 which reports a "Not-in-P" Position, for example, by means of acoustic signals, specifically if the selector lever 3 is in the first shifting path 6. The contact device 35 is provided on the side 37 of the second shafting path 8 which faces away from the first shifting path 6. The contact device 35 and its contact lever 38 are aligned perpendicularly with respect to position H of the selector lever 3 which it takes up in the second shifting path 8.

In contrast, the additional contact device 36 is arranged on the side 39 of the first shifting path 6 facing away from the second shifting path 8 and thus becomes operative when the selector lever 3 is pivoted in the first shifting path 6.

In certain embodiments, for reasons of constructional simplification, the switches 11, 12 and the contact devices 35, 36 are components which are the same in principle and connected by cables to a plug 40.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A shifting arrangement for an automatic transmission of a motor vehicle which is influenced by an electronic control unit, comprising:
   a selector lever pivotable in a first shifting path to select several operating positions and automatically shifting transmission gears, movable via a transverse path into a second shifting path parallel with respect to the first shifting path, a pivoting of the selector lever in a first direction from a neutral center position in the second shifting path causing an upshifting by one gear and a pivoting in a second direction from the neutral center position causing a downshifting by one gear, the selector lever returning to the neutral center position after a shifting operation in the second shifting path;
   a first switch arranged to be actuable by the pivoting of the selector lever in the first direction to cause said upshifting;
   a second switch arranged to be actuable by the pivoting of the selector lever in the second direction to cause said downshifting;
   a first device that interacts with the first switch to actuate the first switch;
   a second device that interacts with the second switch to actuate the second switch;
   wherein the first and second devices each includes a pin and a spring that loads the pin against the selector lever in the direction of the neutral center position.

2. The shifting arrangement according to claim 1, wherein the springs and the pins of the first and second devices are aligned in a longitudinal direction of the second shifting path, and said pins are directly operable by the selector lever.

3. The shifting arrangement according to claim 2, wherein the springs are coil springs arranged coaxially with respect to the pins.

4. The shifting arrangement according to claim 3, wherein each device includes a common housing which houses the spring and the pin of that device.

5. The shifting arrangement according to claim 1, wherein the pins actuate the first and second switches in a force optimum of the springs to produce a defined pressure point (Pd) of the selector lever in the second shifting path.

6. The shifting arrangement according to claim 5, wherein the pins are axially movable and include ramps at one end of the pins, and the first and second switches have actuating pins which are arranged transversely with respect to the longitudinal direction of the pins and are adjusted by ramps of the pins.

7. The shifting arrangement according to claim 6, wherein each ramp is a cone which widens from the direction of the one end of the pin that includes the ramp.

8. The shifting arrangement according to claim 7, wherein the free end of the cone is a head which interacts with the selector lever.

9. The shifting arrangement according to claim 1, further comprising a common bearing plate to which the devices and the switches are fastened.

10. The shifting arrangement according to claim 9, further comprising a shifting arrangement housing, and wherein the bearing plate is constructed as a cover of the shifting arrangement housing.

11. The shifting arrangement according to claim 9, further comprising an electric contact device for the operation of the individual gear shift mechanism coupled to the bearing plate.

12. The shifting arrangement according to claim 11, wherein the contact device is provided on a side of the second shifting path that is furthest away from the first shifting path.

13. The shifting arrangement according to claim 12, further comprising another contact device that provides an acoustical signal reporting a not-in-P position of the selector lever, said another contact device being coupled to the bearing plate.

14. The shifting arrangement according to claim 13, wherein the second contact device is arranged on the side of the first shifting path that is furthest from the second shifting path.

15. The shifting arrangement according to claim 13, wherein the switches and the contact devices are components which are identical.

* * * * *